United States Patent [19]

Avati

[11] Patent Number: 4,653,652
[45] Date of Patent: Mar. 31, 1987

[54] CONSTRUCTION SYSTEM

[76] Inventor: Frank Avati, 4 Brooklyn St., Burwood, New South Wales, Australia

[21] Appl. No.: 694,771

[22] Filed: Jan. 25, 1985

[51] Int. Cl.⁴ .................................................. A47F 5/00
[52] U.S. Cl. ..................................... 211/189; 108/111; 211/182; 312/140
[58] Field of Search .............. 211/189, 190, 191, 182, 211/186, 187, 207, 193; 248/220.1, 222.2, 241; 312/140; 108/111; 403/192, 231, 187

[56] References Cited

U.S. PATENT DOCUMENTS

| | | | |
|---|---|---|---|
| 3,143,981 | 8/1964 | Tassell | 248/243 X |
| 3,353,888 | 11/1967 | Pritella | 312/140 X |
| 3,901,612 | 8/1975 | Canin | 403/231 X |
| 3,945,742 | 3/1976 | Condevaux | 403/192 X |
| 3,966,338 | 6/1976 | Ghyczy | 403/192 |
| 4,071,990 | 2/1978 | Traber | 403/231 X |
| 4,101,226 | 7/1978 | Parisien | 403/187 X |
| 4,126,364 | 11/1978 | Reilly | 312/140 |

FOREIGN PATENT DOCUMENTS 1234777  6/1971  United Kingdom ................ 248/243

Primary Examiner—Robert W. Gibson, Jr.
Attorney, Agent, or Firm—Oblon, Fisher, Spivak, McClelland & Maier

[57] ABSTRACT

A construction system comprising a construction member and a locking connector, the construction member has in opposite faces two pairs of external grooves. The first pair of grooves has a cross-sectional shape which is a major segment of a circle, and the second pair of grooves has a substantially rectangular cross-section. The openings or slots leading to the grooves are of equal length, and the diameter of the first pair of grooves is substantially equal to the width of the second pair of grooves, with the width of adjacent faces of the construction member being in the ratio of 2:1.

3 Claims, 10 Drawing Figures

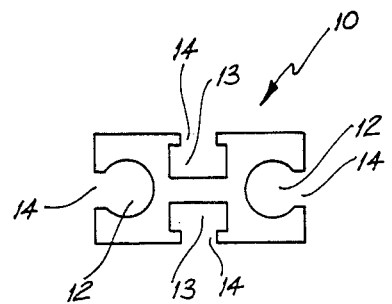
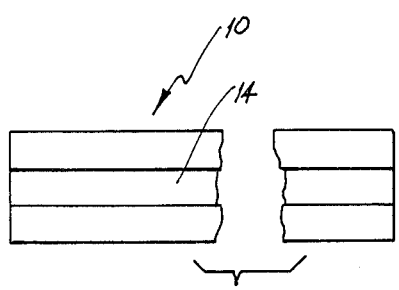
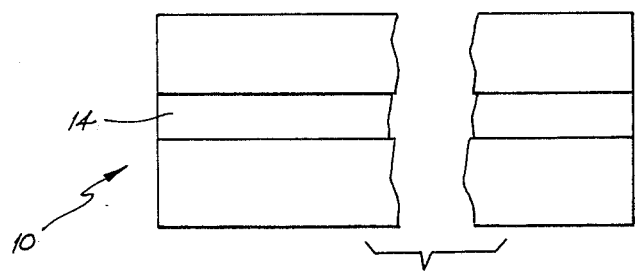
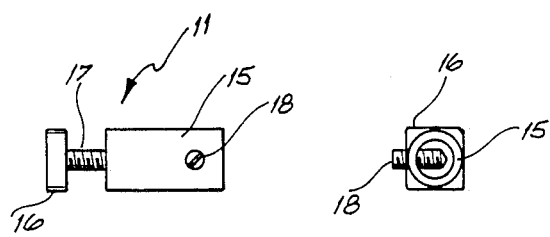
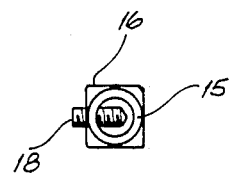

CONSTRUCTION SYSTEM

TECHNICAL FIELD

This invention relates to a system for the construction of metal shelves, furniture and the like without the need for welding, and has as its major object the provision of a specially shaped metal section which can be cut to measure, various sections being conveniently assembled by means of appropriate supports provided with locking screws.

BACKGROUND ART

The published art reveals a great many attempts to produce structural elements which can satisfactorily and rapidly be joined to form furniture, building structures and the like. Lowinger, Australian Pat. No. 152,959 describes a structural element which is shaped to have a plurality of grooves, adapted to receive correspondingly shaped tongue elements. A similar product is described in Bergstrom Australian Pat. No. 273,442, which discloses a tongue element which is designed to be inserted into grooves in the construction members.

In the case of each of the above prior art techniques, construction time is increased due to the fact that, during assembly, an appropriately shaped member must be selected and slotted together with a differently shaped member. Further, the shape of the elements themselves dictates that an excessive degree of manipulation is required correctly to position respective members during construction.

If, as happens in the prior art systems, the groove widens with wear, the screw can simply be tightened to a fix the support in a rigid position.

However in the prior art system as described, two different supports were used, one type for each pair of grooves. Again it was found that construction time was wasted in having to select an appropriate support in each instance. Further the width of the adjacent face of the construction member were not in a whole number ratio, thus limiting the flexibility of application of the member in practice.

SUMMARY OF THE INVENTION

The invention broadly comprises a construction system comprising an elongate substantially rectangular prismatic member having two pairs of grooves parallel to the longitudinal axis thereof, the grooves of each pair being in opposite faces of said member, the first pair having a cross-sectional shape which is a segment of a circle, opening to the respective face at a slot which defines the chord of said segment, the centre of said circle lying inwardly of said slot, the second pair having a rectangular cross section and opening to the respective face by a slot the width of which is less than the width of said rectangle, the slots of the first pair of grooves being of substantially the same width as those of the second pair of grooves, the diameter of the first pair of grooves being substantially equal to the width of the second pair of grooves, the width of the faces of the construction member being in the ratio of 2:1, and connecting elements each comprising a connecting portion adapted to enter said slots, a locking portion adapted to enter any of said grooves, a body portion adapted to engage against a face of said member, said body portion being dimensioned to fit co-axially within a groove of said first pair of grooves of a further such member, said body portion comprising locking means adapted to engage the said groove to lock said body portion therein.

To facilitate the description of the invention reference will now be made to the accompanying drawings, where a presently proposed embodiment of the invention is illustrated by way of example only.

BRIEF DESCRIPTION OF THE DRAWINGS

In the drawings,

FIG. 1 is an end elevation of a construction member for use in the system of an embodiment of the invention;

FIG. 2 is a fragmentary side elevation of the member of FIG. 1;

FIG. 3 is a fragmentary plan view of the member of FIG. 1;

FIG. 4 is a side elevation of a locking connector for use with the member of FIGS. 1-3;

FIG. 5 is an end elevation of the member of FIG. 4;

DETAILED DESCRIPTION OF THE EMBODIMENT

Figure 6:
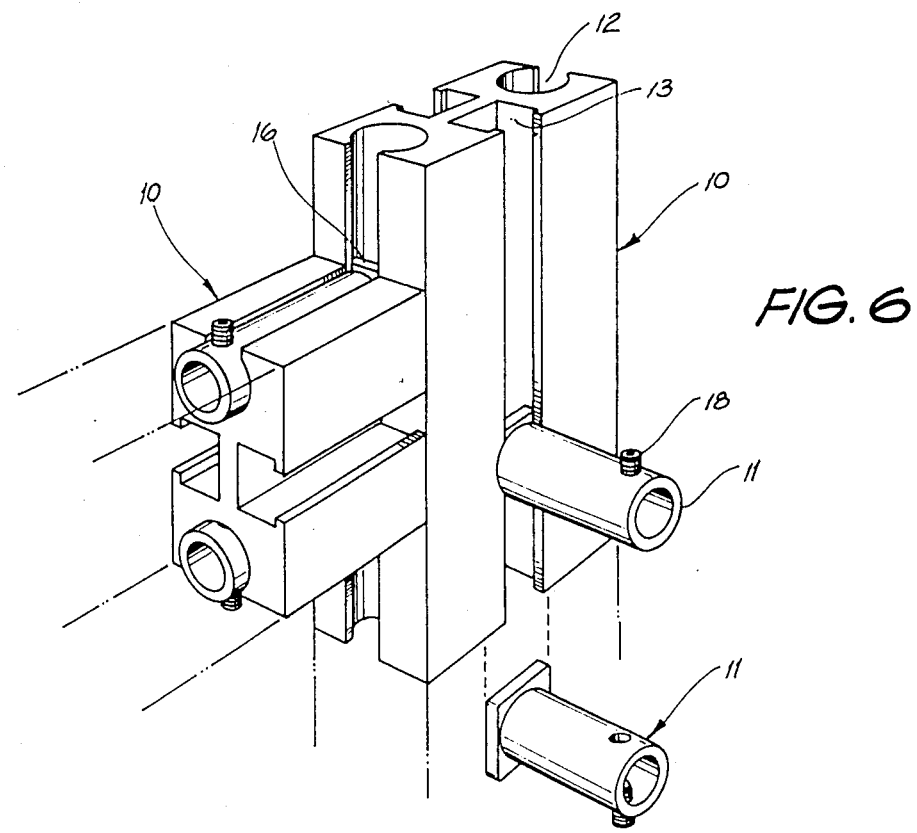
FIGS. 6 and 7 are isometric views demonstrating the interconnection of elements in the system.
Figure 7:
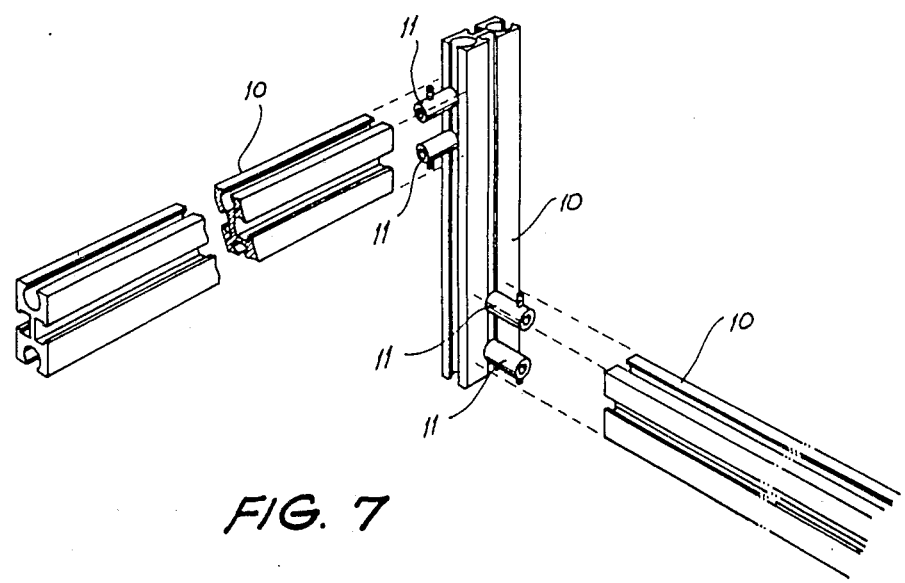

The construction system comprises a construction member 10 and a locking connector 11. In opposite faces, the construction member 10 has two pairs of external grooves, 12 and 13. As can be seen from the illustrated embodiment grooves 12 have a cross sectional shape which is a major segment of a circle, that is to say, that segment of the circle which lies on the side of a chord which is the side on which also lies the centre of the circle, whilst grooves 13 are of a substantially rectangular cross-section.

At the face of the section, the grooves open into slots 14, these being of equal width.

Members 10 can be joined in the construction of furniture and the like by means of connectors 11, which comprises a hollow, cylindrical member or barrel 15, and a square prismatic base member 16, the latter having fixed thereto a threaded shaft 17 which is engaged in a correspondingly threaded aperture in the adjacent end of the barrel 15.

A grub screw 18 is provided adjacent the end of the barrel 15 remote from the base member 16, the screw 18 being engaged in a threaded aperture in one side of the barrel 15 and aligned with an aperture on the opposite side of the barrel.

To join two members 10 at right angles, two connectors 11 are required as shown in FIG. 6. The base member 16 of each connector is inserted into groove 12 or 13. The base member 16 is then fixed against movement by rotating the barrel 15 about the threaded shaft 17 until the barrel 15 is firmly secured against the face of the member 10 and the base member 15 locked within the groove 12 or 13, the connectors 11 being spaced by a distance equal to the axial separation of the grooves 12.

The member 10 to be joined to the first member 10 is then introduced, and the barrel 15 of each connector 11 is inserted into the end of an opposing groove 12. The screw 18 of each connector 11 is then turned until the end of the screw 18 passes through the aperture in the opposite wall of the barrel 15 to firmly contact the adjacent wall of the groove 12, thereby locking the barrel 15 within the groove 12.

Figure 8:
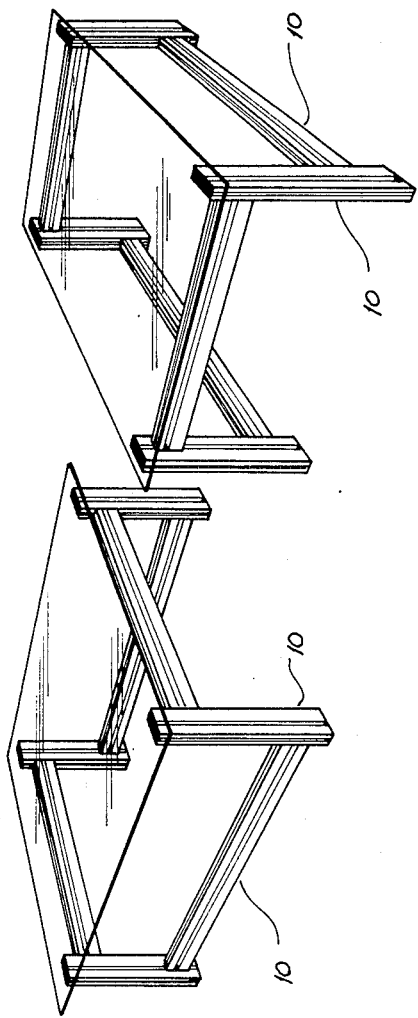
FIG. 8 illustrates a table assembled from elements of the system.

By joining sections in appropriate ways, various items of furniture such as the table shown in FIG. 8 can readily and easily be assembled. The system can be readily adapted to construct display cabinets and the like.

Figure 9:
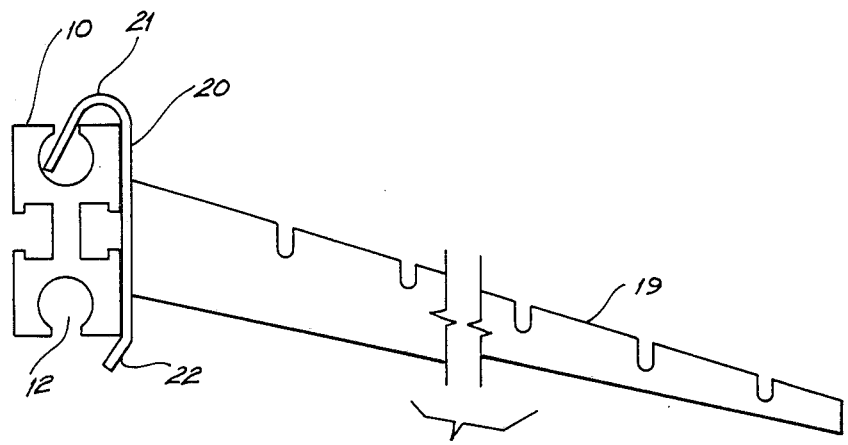
FIGS. 9 and 10 show in side elevation, application of the system to display racks.
Figure 10:
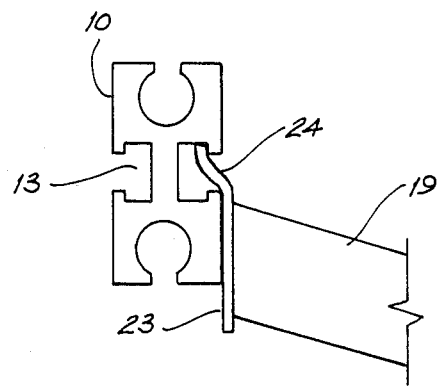

A further application of the system is in the provision of racks for use in the fashion industry and retail stores for the display of garments. In this application, a member 10 is mounted horizontally at a suitable height. A rack fitting 19, of which that shown in FIGS. 9 and 10 is merely an example, is attached to an attachment member 20 shaped to engage the member 10. In FIG. 9, the attachment member 20 has a hook-like portion 21 at its upper edge and a lower portion 22 bent inwardly from the vertical plane so as to be located beneath the member 10.

An alternative attachment member 23 is shown in FIG. 10. The alternative attachment member 23 comprising an inwardly bent upper edge portion 24 for engagement within a groove 14.

I claim:

1. A construction system comprising an elongate substantially rectangular prismatic member having two pairs of grooves parallel to the longitudinal axis thereof, the grooves of each pair being in opposite faces of said member, the first pair having a cross-sectional shape which is a segment of a circle, opening to the respective face at a slot which defines the chord of said segment, the centre of said circle lying inwardly of said slot, the second pair having a rectangular cross section and opening to the respective face by a slot the width of which is less than the width of said rectangle, the slots of the first pair of grooves being of substantially the same width as those of the second pair of grooves, the diameter of the first pair of grooves being substantially equal to the width of the second pair of grooves, the width of the faces of the construction member being in the ratio of 2:1, and connecting elements each comprising a connecting portion adapted to enter said slots, a locking portion adapted to enter any of said grooves, a body portion adapted to engage against a face of said member, said body portion being dimensioned to fit co-axially within a groove of said first pair of grooves of a further such member, said body portion comprising locking means adapted to engage the said groove to lock said body portion therein.

2. A construction system according to claim 1 wherein said connecting portion comprises a screw threaded shaft fixed to said locking portion and threadedly engaged with said body portion.

3. A construction system according to claim 2 wherein said locking portion comprises a rectangular prismatic body of a width substantially equal to the width of the grooves of said second pair.

* * * * *